United States Patent
Sun et al.

(10) Patent No.: US 10,287,443 B2
(45) Date of Patent: May 14, 2019

(54) ELECTROTHERMAL MATERIAL COMPOSITION AND ELECTROTHERMAL TEXTILE

(71) Applicant: INDUSTRIAL TECHNOLOGY RESEARCH INSTITUTE, Hsinchu (TW)

(72) Inventors: Wen-Hsien Sun, Taoyuan (TW); Chih-Lung Chen, Zhudong Township (TW); Jing-Wen Tang, Hsinchu (TW); Ruey-Ling Liu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 365 days.

(21) Appl. No.: 15/394,266

(22) Filed: Dec. 29, 2016

(65) Prior Publication Data
US 2018/0187024 A1    Jul. 5, 2018

(51) Int. Cl.
*C09D 5/24* (2006.01)
*C08K 3/08* (2006.01)
(Continued)

(52) U.S. Cl.
CPC ........... *C09D 5/24* (2013.01); *C08G 18/0823* (2013.01); *C08G 18/10* (2013.01); *C08G 18/758* (2013.01);
(Continued)

(58) Field of Classification Search
CPC ... C09D 5/24; C09D 7/61; C09D 7/70; C08K 3/08; C08K 2003/0806; C08K 2201/001;
(Continued)

(56) References Cited

U.S. PATENT DOCUMENTS 7,151,062 B2  12/2006  DeAngelis et al.
7,838,804 B2  11/2010  Krobok
(Continued)

FOREIGN PATENT DOCUMENTS

CN    101052246 A    10/2007
CN    100536625 C     9/2009
(Continued)

OTHER PUBLICATIONS

Cheong et al., "Highly Flexible Transparent Thin Film Heaters Based on Silver Nanowires and Aluminum Zinc Oxides," Thin Solid Films, vol. 589, 2015 (Available online Jul. 2, 2015), pp. 633-641.
(Continued)

*Primary Examiner* — Michael C Miggins
(74) *Attorney, Agent, or Firm* — Birch, Stewart, Kolasch & Birch, LLP

(57) ABSTRACT

An electrothermal composition and electrothermal textiles are provided. The electrothermal composition includes a polyurethane and a plurality of metal nanomaterials. The polyurethane has repeating unit of Formula (I):

Formula (I)

(Continued)

wherein $R^1$ is

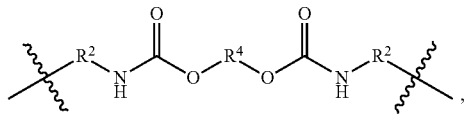

$R^2$ is

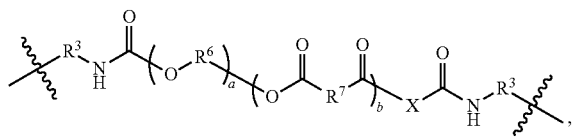

$R^3$ is

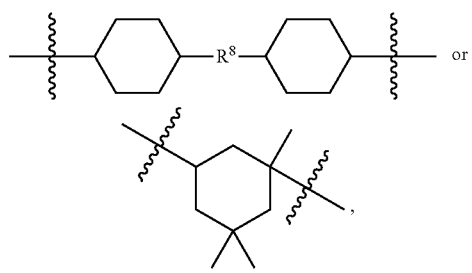

$R^4$ is

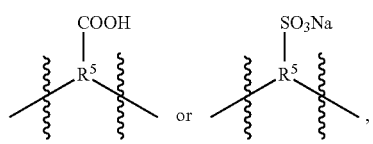

$R^5$ is $C_{1-4}$ alkylene group, $R^6$ is $C_{2-6}$ alkylene group, $R^7$ is $C_{2-6}$ alkylene group, $R^8$ is $C_{1-4}$ alkylene group, X is

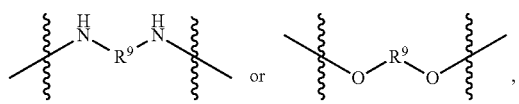

$R^9$ is $C_{2-6}$ alkylene group, a is 1 to 100, b is 0 to 100, and a≥b. The polyurethane has dynamic viscosity of 1000 cP to 5000 cP at 25° C.

20 Claims, 1 Drawing Sheet

(51) Int. Cl.
C08G 18/10 (2006.01)
C08G 18/75 (2006.01)
D06M 15/572 (2006.01)
D06M 15/568 (2006.01)
H05B 3/34 (2006.01)
C08G 18/08 (2006.01)
C09D 7/61 (2018.01)
C09D 7/40 (2018.01)
D06M 11/74 (2006.01)
D06M 11/83 (2006.01)
D06M 23/08 (2006.01)
D06M 23/12 (2006.01)
D06M 101/32 (2006.01)
C08K 3/04 (2006.01)

(52) U.S. Cl.
CPC ............ C08K 3/08 (2013.01); C09D 7/61 (2018.01); C09D 7/70 (2018.01); D06M 11/74 (2013.01); D06M 11/83 (2013.01); D06M 15/568 (2013.01); D06M 15/572 (2013.01); D06M 23/08 (2013.01); D06M 23/12 (2013.01); H05B 3/347 (2013.01); C08K 3/04 (2013.01); C08K 2003/0806 (2013.01); C08K 2201/001 (2013.01); C08K 2201/011 (2013.01); D06M 2101/32 (2013.01)

(58) Field of Classification Search
CPC .... C08K 3/04; C08K 2201/011; C08G 18/10; C08G 18/758; C08G 18/0823; H05B 3/347; D06M 15/572; D06M 15/568; D06M 11/74; D06M 11/83; D06M 23/08; D06M 23/12; D06M 2101/32
See application file for complete search history.

(56) References Cited

U.S. PATENT DOCUMENTS

| 8,288,693 | B2 | 10/2012 | Weiss et al. |
| 2009/0218854 | A1 | 9/2009 | Pfahler et al. |
| 2012/0294659 | A1 | 11/2012 | Lee et al. |
| 2014/0318857 | A1 | 10/2014 | Sun et al. |

FOREIGN PATENT DOCUMENTS

| CN | 105821519 A | 8/2016 |
| TW | 200815545 A | 4/2008 |
| TW | 201441445 A | 11/2014 |
| TW | M533085 U | 12/2016 |

OTHER PUBLICATIONS

Govaert et al., "Preparation and Application of Conductive Textile Coatings Filled with Honeycomb Structured Carbon Nanotubes," Journal of Nanomaterials, vol. 2014, Article ID 651265, Jun. 18, 2014, pp. 1-6 (Total 7 pages).

Kim et al., "Transparent Flexible Heater Based on Hybrid of Carbon Nanotubes and Silver Nanowires," Carbon, vol. 63, 2013 (Available online Jul. 15, 2013), pp. 530-536.

Kim et al., "Uniformly Interconnected Silver-Nanowire Networks for Transparent Film Heaters," Adv. Funct. Mater., vol. 23, 2013, pp. 1250-1255.

Zhang et al., "Large-size Graphene Microsheets as a Protective Layer for Transparent Conductive Silver Nanowire Film Heaters," Carbon, vol. 69, Apr. 2014 (Available online Dec. 19, 2013), pp. 437-443 (Total 8 pages).

Taiwanese Office Action and Search Report, dated Sep. 27, 2017, for Taiwanese Application No. 105143832.

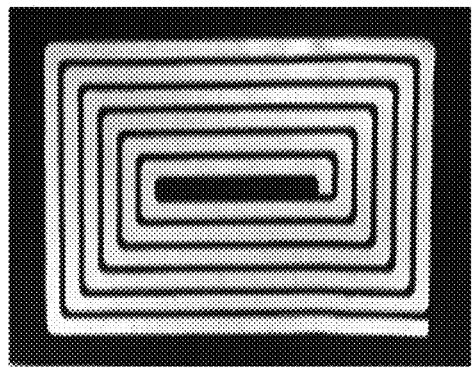
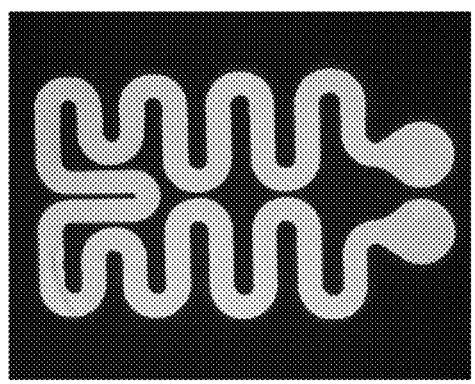
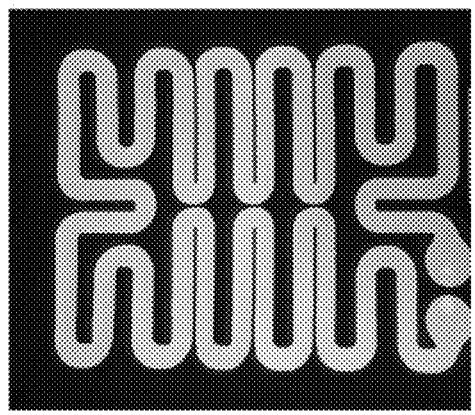
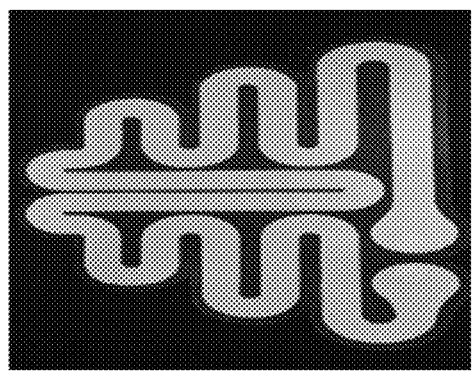

ELECTROTHERMAL MATERIAL COMPOSITION AND ELECTROTHERMAL TEXTILE

TECHNICAL FIELD

The technical field relates to an electrothermal material composition and an electrothermal textile.

BACKGROUND

Most of developments of electrothermal textiles are focus on textile materials having heating and preserving heat functions. Those functions of electrothermal textiles after washing are often diminished.

As such, increasing water washing resistance of an electrothermal textile and developing a patternable electrothermal textile are modern mainstreams for variable requirements.

SUMMARY

One embodiment of the disclosure provides an electrothermal material composition, including: a polyurethane having a repeating unit of Formula (I):

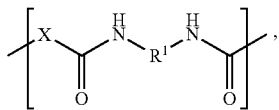

Formula (I)

wherein $R^1$ is

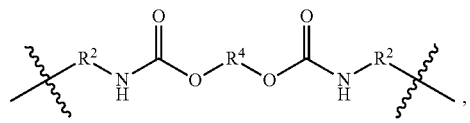

$R^2$ is

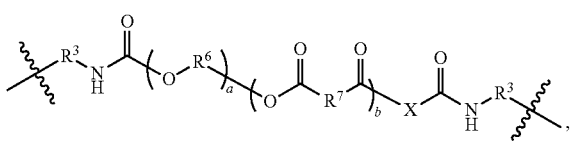

$R^3$ is

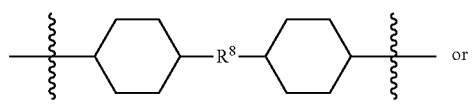

or

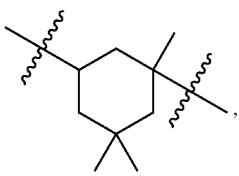

$R^4$ is

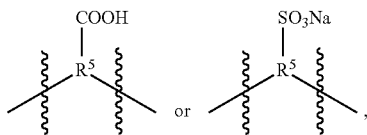

or $R^5$ is $C_{1-4}$ alkylene group, $R^6$ is $C_{2-6}$ alkylene group, $R^7$ is $C_{2-6}$ alkylene group, $R^8$ is $C_{1-4}$ alkylene group, X is

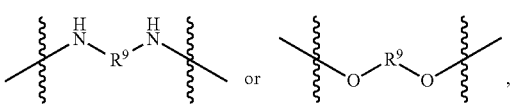

or $R^9$ is $C_{2-6}$ alkylene group, a is 1 to 100, b is 0 to 100, and a≥b, wherein the polyurethane has dynamic viscosity of 1000 cP to 5000 cP at 25° C.; and a plurality of metal nanomaterials are dispersed in the polyurethane. The metal nanomaterials and the electrothermal material composition have a weight ratio of 30:100 to 60:100.

One embodiment of the disclosure provides an electrothermal textile, including: a textile base; and an electrothermal material composition formed on the textile base, wherein the electrothermal material composition includes: a polyurethane having a repeating unit of Formula (I):

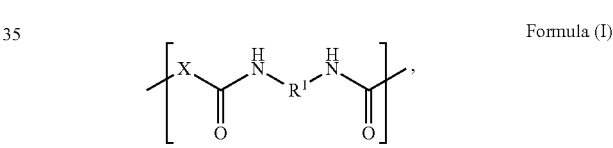

Formula (I)

wherein $R^1$ is

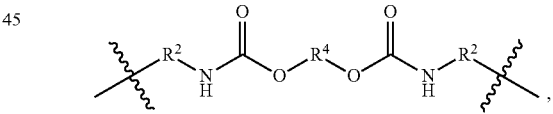

$R^2$ is

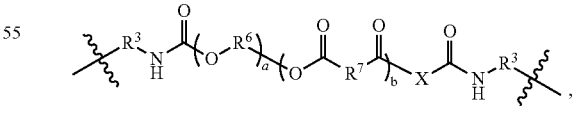

$R^3$ is

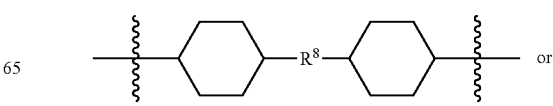

or

-continued

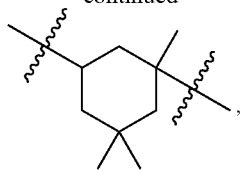

R⁴ is

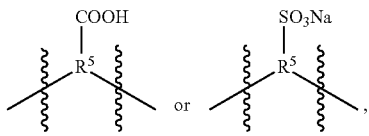

$R^5$ is $C_{1-4}$ alkylene group, $R^6$ is $C_{2-6}$ alkylene group, $R^7$ is $C_{2-6}$ alkylene group, $R^8$ is $C_{1-4}$ alkylene group, X is

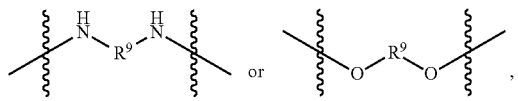

$R^9$ is $C_{2-6}$ alkylene group, a is 1 to 100, b is 0 to 100, and a≥b, wherein the polyurethane has dynamic viscosity of 1000 cP to 5000 cP at 25° C.; and a plurality of metal nanomaterials are dispersed in the polyurethane, wherein the metal nanomaterials and the electrothermal material composition have a weight ratio of 30:100 to 60:100.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein:

FIG. 1 shows different manners of a patternable electrothermal material composition in one embodiment of the disclosure.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

One embodiment of the disclosure provides an electrothermal material composition, including: a polyurethane having a repeating unit of Formula (I):

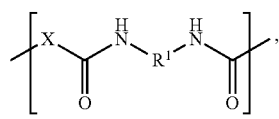

Formula (I)

wherein $R^1$ is

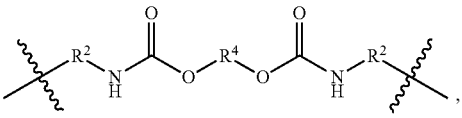

$R^2$ is

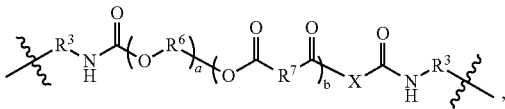

$R^3$ is

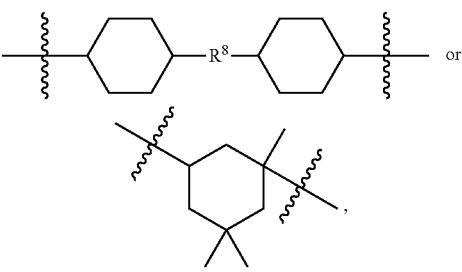

$R^4$ is

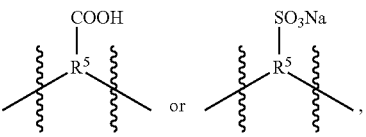

$R^5$ is $C_{1-4}$ alkylene group, $R^6$ is $C_{2-6}$ alkylene group, $R^7$ is $C_{2-6}$ alkylene group, $R^8$ is $C_{1-4}$ alkylene group, X is

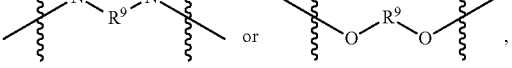

$R^9$ is $C_{2-6}$ alkylene group, a is 1 to 100, b is 0 to 100, and a≥b, wherein the polyurethane has dynamic viscosity of 1000 cP to 5000 cP at 25° C.; and a plurality of metal nanomaterials are dispersed in the polyurethane. The metal nanomaterials and the electrothermal material composition have a weight ratio of 30:100 to 60:100. In one embodiment, the metal nanomaterials and the electrothermal material composition have a weight ratio of 35:100 to 55:100. In one embodiment, the metal nanomaterials and the electrothermal material composition have a weight ratio of 40:100 to 50:100.

An overly low ratio of the metal nanomaterials cannot easily form a conducting network. An overly high ratio of the metal nanomaterial may negatively influence the coating process of the electrothermal material composition due to increasing the viscosity of the electrothermal material composition.

In one embodiment, the polyurethane and the electrothermal material composition have a weight ratio of about 40:100 to 50:100. Nano powder is easily unevenly dispersed in an overly low ratio of the polyurethane. An overly high ratio of the polyurethane may reduce the electrically conductivity of the electrothermal material composition.

In one embodiment, the polyurethane is formed by reacting 1,4-butanediol and a second polyurethane. The second polyurethane is formed by reacting dimethylolpropionic acid and a prepolymer. The prepolymer is formed by reacting 4,4'-methylene dicyclohexyl diisocyanate and poly(1,4-butylene adipate).

In one embodiment, the electrothermal material composition may further include a plurality of carbon nanomaterials dispersed in the polyurethane, wherein the carbon nanomaterials and the electrothermal material composition have a weight ratio of 1:100 to 10:100. An overly low ratio of the carbon nanomaterials easily results in a lower heat temperature. An overly high ratio of the carbon nanomaterials may raise the surface electrical resistance of the electrothermal material composition.

In one embodiment, the carbon nanomaterials can be carbon capsule, carbon tube, graphite sheet, or a combination thereof. The carbon nanocapsule may have a size of about 10 nm to 80 nm, the carbon nanotube may have a size of about 10 nm to 60 nm, and the graphite sheet may have a size of about 1 μm to 10 μm.

An overly small carbon nanomaterial may have a non-obvious heating effect and a lower heat temperature. An overly large carbon nanomaterial may block the conductive path of the metal nanomaterial, thereby increasing the surface electrical resistance of the electrothermal material composition.

In one embodiment, the metal nanomaterials can be metal nanowire, metal nano flake, metal nanoparticle, or a combination thereof. The metal nanowire can be gold, silver, copper, indium, palladium, aluminum, iron, cobalt, nickel, an alloy thereof, an oxide thereof, or a mixture thereof. Alternatively, the metal nanowire can be a silver nanowire wrapped by gold, a gold nanowire wrapped by silver, a copper nanowire wrapped by gold, a gold nanowire wrapped by copper, a copper nanowire wrapped by silver, a silver nanowire wrapped by copper, or a combination thereof.

In one embodiment, the metal nano flake can be gold, silver, copper, indium, palladium, aluminum, iron, cobalt, nickel, an alloy thereof, an oxide thereof, or a mixture thereof. Alternatively, the metal nanowire can be a silver nano flake wrapped by gold, a gold nano flake wrapped by silver, a copper nano flake wrapped by gold, a gold nano flake wrapped by copper, a copper nano flake wrapped by silver, a silver nano flake wrapped by copper, or a combination thereof.

In one embodiment, the metal nanoparticle can be gold, silver, copper, indium, palladium, aluminum, iron, cobalt, nickel, an alloy thereof, an oxide thereof, or a mixture thereof. Alternatively, the metal nanoparticle can be a silver nanoparticle wrapped by gold, a gold nanoparticle wrapped by silver, a copper nanoparticle wrapped by gold, a gold nanoparticle wrapped by copper, a copper nanoparticle wrapped by silver, a silver nanoparticle wrapped by copper, or a combination thereof.

In one embodiment, the metal nanowire has a length of about 15 μm to 20 μm. An overly short metal nanowire needs to be added more into the electrothermal material composition for forming a conductive network. An overly long metal nanowire may aggregate. In one embodiment, the metal nanowire has a diameter of about 50 nm to 100 nm.

In one embodiment, the metal nanowire has an aspect ratio (AR) of about 250 to 400. A metal nanowire with an overly low aspect ratio needs to be added more into the electrothermal material composition for forming a conductive network. A metal nanowire with an overly high aspect ratio may aggregate.

In one embodiment, the metal nano flake has a size of about 1 μm to 30 μm. An overly small metal nano flake needs to be added more into the electrothermal material composition for forming a conductive network. An overly large metal nano flake may aggregate. In one embodiment, the metal nano flake has a size of about 5 μm to 15 μm.

In one embodiment, the metal nanoparticles have a diameter of about 1 μm to 10 μm. An overly small metal nanoparticles needs to be added more into the electrothermal material composition for forming a conductive network. An overly large metal nanoparticle may aggregate. In one embodiment, the metal nanoparticle has a diameter of about 2 μm to 5 μm.

In one embodiment, the metal nano materials can be a combination of the metal nanowire and the metal nano flake, in which the metal nanowire and the metal nano flake have a weight ratio of about 0.01:1 to 1:1, or a weight ratio of about 0.04:1 to 0.6:1.

In one embodiment, the polyurethane has an dynamic viscosity of about 1000 cP to 5000 cP (centipoises) at 25° C. Polyurethane with an overly low viscosity may result in an overly thin coating of the electrothermal material composition on the textile base, thereby degrading the performance of the electrothermal textile. Polyurethane with an overly high viscosity may cause that the electrothermal material composition cannot be coated.

In one embodiment, the manner of the electrothermal material composition on the textile base can be a whole area covering or a pattern as shown in FIG. 1. The pattern is a continuous pattern of conductive trace, and another proper manner can be designed for real practice if necessary.

In one embodiment, an electrothermal textile, including: a textile base; and an electrothermal material composition formed on the textile base. In one embodiment, the electrothermal material composition is formed on the textile base by post-treatment, e.g. coating method. Thickness of the electrothermal material composition can be tuned to about 20 μm to 100 μm for meeting the requirement, and thickness of the textile base can be tuned for meeting the requirement (e.g. weight per yard of 100 g/Y to 600 g/Y). The electrothermal material composition includes: a polyurethane having a repeating unit of Formula (I):

Formula (I)

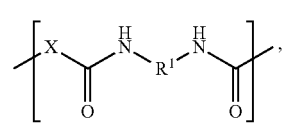

wherein R¹ is

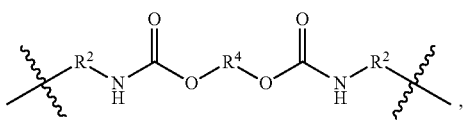

$R^2$ is

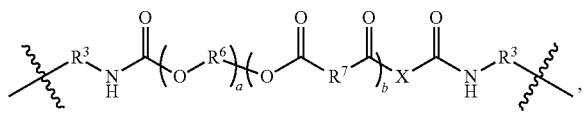

$R^3$ is

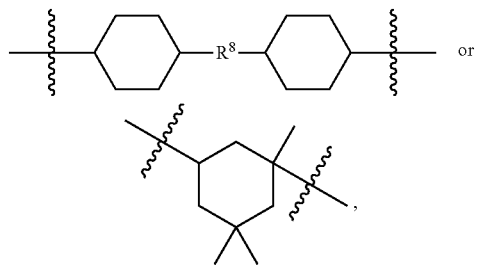

$R^4$ is

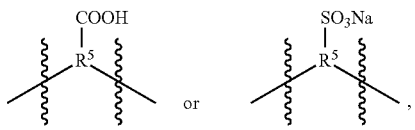

$R^5$ is $C_{1-4}$ alkylene group, $R^6$ is $C_{2-6}$ alkylene group, $R^7$ is $C_{2-6}$ alkylene group, $R^8$ is $C_{1-4}$ alkylene group, X is

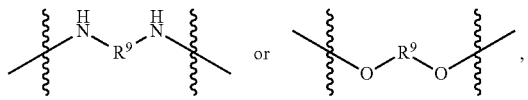

$R^9$ is $C_{2-6}$ alkylene group, a is 1 to 100, b is 0 to 100, and a≥b, wherein the polyurethane has dynamic viscosity of 1000 cP to 5000 cP at 25° C.; and a plurality of metal nanomaterials are dispersed in the polyurethane, wherein the metal nanomaterials and the electrothermal material composition have a weight ratio of 30:100 to 60:100. In one embodiment, the metal nanomaterials and the electrothermal material composition have a weight ratio of 35:100 to 55:100. In one embodiment, the metal nanomaterials and the electrothermal material composition have a weight ratio of 40:100 to 50:100.

An overly low ratio of the metal nanomaterials cannot easily form a conducting network. An overly high ratio of the metal nanomaterial may negatively influence the coating process of the electrothermal material composition due to increasing the viscosity of the electrothermal material composition.

In one embodiment, the electrothermal material composition is coated on the surface of the textile base to form the electrothermal textile.

In one embodiment, the electrothermal material composition may further include a plurality of carbon nanomaterials dispersed in the polyurethane, wherein the carbon nanomaterials and the electrothermal material composition have a weight ratio of 1:100 to 10:100. An overly low ratio of the carbon nanomaterials easily results in a lower heat temperature. An overly high ratio of the carbon nanomaterials may raise the surface electrical resistance of the electrothermal material composition.

In one embodiment, the textile base of the electrothermal textile may include a fiber cloth, which can be cotton, linen, wool, silk, rayon, nylon, polyethylene, polypropylene, polyamide, polyester, acetate, spandex, or a combination thereof.

In one embodiment, the carbon nanomaterials can be carbon capsule, carbon tube, graphite sheet, or a combination thereof. The carbon nanocapsule may have a size of about 10 nm to 80 nm, the carbon nanotube may have a size of about 10 nm to 60 nm, and the graphite sheet may have a size of about 1 μm to 10 μm. An overly small carbon nanomaterial may have a non-obvious heating effect and a lower heat temperature. An overly large carbon nanomaterial may block the conductive path of the metal nanomaterial, thereby increasing the surface electrical resistance of the electrothermal material composition.

In one embodiment, the metal nanomaterials can be metal nanowire, metal nano flake, metal nanoparticle, or a combination thereof. The metal nanowire can be gold, silver, copper, indium, palladium, aluminum, iron, cobalt, nickel, an alloy thereof, an oxide thereof, or a mixture thereof. Alternatively, the metal nanowire can be a silver nanowire wrapped by gold, a gold nanowire wrapped by silver, a copper nanowire wrapped by gold, a gold nanowire wrapped by copper, a copper nanowire wrapped by silver, a silver nanowire wrapped by copper, or a combination thereof.

Alternatively, the metal nano flake can be gold, silver, copper, indium, palladium, aluminum, iron, cobalt, nickel, an alloy thereof, an oxide thereof, or a mixture thereof. Alternatively, the metal nanowire can be a silver nano flake wrapped by gold, a gold nano flake wrapped by silver, a copper nano flake wrapped by gold, a gold nano flake wrapped by copper, a silver nano flake wrapped by copper, or a combination thereof.

In a further embodiment, the metal nanoparticle can be gold, silver, copper, indium, palladium, aluminum, iron, cobalt, nickel, an alloy thereof, an oxide thereof, or a mixture thereof. Alternatively, the metal nanoparticle can be a silver nanoparticle wrapped by gold, a gold nanoparticle wrapped by silver, a copper nanoparticle wrapped by gold, a gold nanoparticle wrapped by copper, a copper nanoparticle wrapped by silver, a silver nanoparticle wrapped by copper, or a combination thereof.

In one embodiment, the metal nanowire has a length of about 15 μm to 20 μm. An overly short metal nanowire needs to be added more into the electrothermal material composition for forming a conductive network. An overly long metal nanowire may aggregate. In one embodiment, the metal nanowire has a diameter of about 50 nm to 100 nm.

In one embodiment, the metal nanowire has an aspect ratio (AR) of about 250 to 400. A metal nanowire with an overly low aspect ratio needs to be added more into the electrothermal material composition for forming a conductive network. A metal nanowire with an overly high aspect ratio may aggregate.

Alternatively, the metal nano flake has a size of about 1 μm to 30 μm. An overly small metal nano flake needs to be added more into the electrothermal material composition for forming a conductive network. An overly large metal nano flake may aggregate. In one embodiment, the metal nano flake has a size of about 5 μm to 15 μm.

In one embodiment, the metal nanoparticles have a diameter of about 1 μm to 10 μm. An overly small metal nanoparticles needs to be added more into the electrothermal material composition for forming a conductive network. An overly large metal nanoparticle may aggregate. In one embodiment, the metal nanoparticle has a diameter of about 2 μm to 5 μm.

Furthermore, in one embodiment, the polyurethane has an dynamic viscosity of about 1000 cP to 5000 cP at 25° C. Polyurethane with an overly low viscosity may result in an overly thin coating of the electrothermal material composition on the textile base, thereby degrading the performance of the electrothermal textile. Polyurethane with an overly high viscosity may cause that the electrothermal material composition cannot be coated.

In one embodiment, the manner of the electrothermal material composition includes not only a whole area, but also a pattern as shown in FIG. 1. The pattern is a continuous pattern of conductive trace, and another proper manner can be designed for real practice if necessary.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

EXAMPLES

Example 1

Electrothermal Material Composition

Preparation of Polyurethane 0.4 mole of 4,4'-methylene dicyclohexyl diisocyanate and 0.2 mole of poly(1,4-butylene adipate) (PBA, Mn≈1000) were added into a reactor, and reacted at 50° C. to 90° C. under nitrogen to form a prepolymer. Subsequently, the prepolymer was reacted with 0.1 mole of dimethylolpropionic acid (DMPA), and then reacted with 0.1 mole of 1,4-butanediol (BDO) to form polyurethane A. The reaction is shown below:

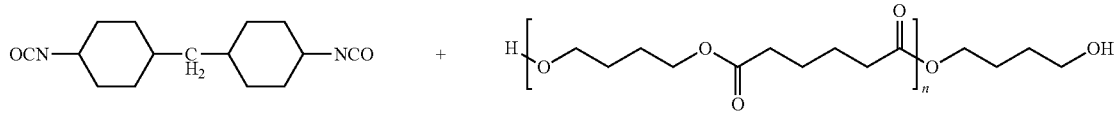

(OCN-R-NCO)

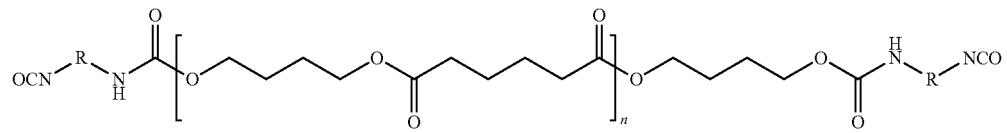

(OCN-R'-NCO)

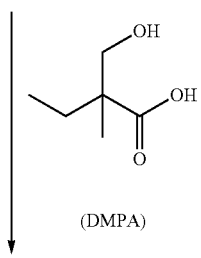

(DMPA)

-continued

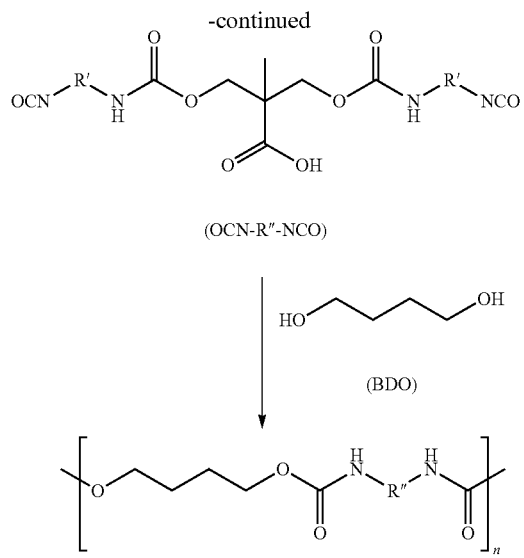

In the reaction, the reaction solution has a solid content of about 20% to 30%, and solvent (e.g. acetone) could be added if necessary.

5 g of polyurethane A, 0.5 g of water, and 4.5 g of silver nano flake (with a size of about 10 μm) were mixed to form an electrothermal material composition with a total silver content of about 45 wt %.

Example 2

Preparation and Electrical Test of Electrothermal Textile

The electrothermal material composition in Example 1 was coated on a surface of a fabric base (polyester fiber cloth, commercially available from CHULEE WELL INCORPORATION) to obtain an electrothermal textile, in which the electrothermal material composition had a thickness of about 50 μm, the textile base had weight per yard of 260 g/Y. The surface electrical resistance (Ω/□) of the electrothermal textile is shown in Table 1.

Comparative Examples 1 to 3

Electrical Tests of Electrothermal Textiles

The electrothermal textiles in Comparative Examples 1 to 3 were commercially available from Asiatic Fiber Corporation, X-Static, and LONG YOUNG Company. In Comparative Examples 1 to 3, the fibers were coated by silver, and then woven to form the cloth.

The surface electrical resistances (Ω/□) of the electrothermal textiles before being washed by water and after being washed by water 20 times were measured to calculate the variability of the surface electrical resistances, as shown in Table 1.

TABLE 1

| Electrothermal textile | Comparative Example 1 | Comparative Example 2 | Comparative Example 3 | Example 2 |
| --- | --- | --- | --- | --- |
| Before water washing | 0.17 | 0.32 | 0.16 | 0.39 |
| After water washing 20 times | 100.45 | 228.86 | 22.94 | 0.59 |
| Variability (×100%) | 590 | 714 | 142 | 0.51 |

As shown in a comparison of electrical tests, the resistance of the commercially available electrothermal textile obviously increased after the water washing. In Comparative Examples 1 to 3, the surface electrical resistances (Ω/□) of the electrothermal textiles were increased from about $10^{-1}$ Ω/□ (before the water washing) to at least $10^2$ Ω/□ (after the water washing 20 times). The surface electrical resistance of the electrothermal textile in the disclosure were kept (e.g. with the low variability of 0.51%) after the water washing 20 times.

In addition, the color fastness to water washing and perspiration of the electrothermal textile in Example 2 were tested. The color fastness to water washing of the textile was measured by a standard AATCC-61-2A of American Association of Textile Chemists and Colorists (AATCC), in which the color change level of the textile after water washing was level 1 to 5, level 5 was best, and level 1 was worst. The color fastness to perspiration was measured by a standard AATCC 15-2009 of AATCC, in which the color change level was level 1 to 5, level 5 was best, and level 1 was worst. The electrothermal textile in Example 2 had a color fastness level 4 to 5 to water washing, and a color fastness level 4 to 5 to perspiration. It showed that the electrothermal textile had water washing resistance, and the color dyed on the electrothermal textile was still kept after washing the textile in water or dipping the textile in perspiration.

Example 3

Electrical Tests of Electrothermal Textile

Example 3 was similar to Example 2, with the difference of the polyurethane A being replaced with polyether polyurethane (WU-3020). The surface electrical resistances of the electrothermal material composition in Example 3 before the water washing and after water washing 20 times were measured, as tabulated in Table 2.

Comparative Examples 4 to 6

Electrical Tests of Electrothermal Textiles

Comparative Examples 4 to 6 were similar to Example 2, with difference of the polyurethane A being replaced with variable polymers. In Comparative Example 4, the polymer was poly(methyl methacrylate) (PMMA, TDM4009). In Comparative Example 5, the polymer was epoxy resin (1106-85). In Comparative Example 6, the polymer was polyethylene terephthalate (PET, PET 9100).

The surface electrical resistances of the electrothermal textiles in Comparative Examples 4 to 6 before and after water washing 20 times were measured to check the influence of different polymers, as tabulated in Table 2.

TABLE 2

| Electrothermal textile | Surface electrical resistance before water washing (Ω/□) | Surface electrical resistance after water washing 20 times (Ω/□) |
|---|---|---|
| Comparative Example 4 | $3.40 \times 10^{-1}$ | Non-conductive |
| Comparative Example 5 | $2.40 \times 10^{0}$ | Non-conductive |
| Comparative Example 6 | $1.11 \times 10^{-1}$ | Non-conductive |
| Example 3 | $2.49 \times 10^{-1}$ | $3.44 \times 10^{1}$ |
| Example 2 | $3.89 \times 10^{-1}$ | $5.91 \times 10^{-1}$ |

As shown in Table 2, the polymers used in general conductive compositions were adopted in Comparative Examples 4 to 6, and the electrothermal textiles in Comparative Examples 4 to 6 did not have conductive property after water washing 20 times. The surface electrical resistance of the electrothermal textile in the disclosure was kept without obvious change after water washing 20 times. Accordingly, the electrothermal textile in the disclosure had water washing resistance.

Examples 4 to 9

Preparations and Electrical Tests of Electrothermal Textiles

Examples 4 to 9 were similar to Example 2, with differences of silver nanowire (AgNW) being added, the polyurethane ratio being changed, and the silver flake (AgF) being changed. The ratios of the silver nanowire and the silver flake are tabulated in Table 3.

The surface electrical resistance of the electrothermal textile was influenced by different ratios of the silver nanowire to the silver nano flake, as tested and tabulated in Table 3. The silver content was fixed at 50% or 45%, and the ratio of the silver nanowire and the silver nano flake (with a size of about 10 μm) was changed (e.g. increasing the silver nanowire was equal to decrease the silver nano flake, and vice versa). For example, when the silver nanowire ratio increased from 2.5% to 17.5% (or from 7.5% to 12.5%), the surface electrical resistance of the electrothermal textile was correspondingly decreased. In addition, when the silver nanowire ratio achieved 10%, the total silver content could decrease to 45%.

TABLE 3

| Electrothermal textile | Polyurethane A (%) | AgF (%) | AgNW (%) | Total silver content (%) | Water (%) | Surface electrical resistance (Ω/□) |
|---|---|---|---|---|---|---|
| Example 4 | 45 | 47.5 | 2.5 | 50 | 5 | $7.81 \times 10^{-1}$ |
| Example 5 | 45 | 37.5 | 12.5 | 50 | 5 | $2.01 \times 10^{-1}$ |
| Example 6 | 45 | 32.5 | 17.5 | 50 | 5 | $1.72 \times 10^{-1}$ |
| Example 7 | 50 | 37.5 | 7.5 | 45 | 5 | $3.56 \times 10^{-1}$ |
| Example 8 | 50 | 35 | 10 | 45 | 5 | $1.85 \times 10^{-1}$ |
| Example 9 | 50 | 32.5 | 12.5 | 45 | 5 | $1.76 \times 10^{-1}$ |

Furthermore, the water washing resistances of the electrothermal textiles in Examples 6 and 9 were tested, as tabulated in Table 4. The surface electrical resistances of the electrothermal textile in Example 6 (45% of polyurethane A and 50% of total silver content) and the electrothermal textile in Example 9 (50% of polyurethane A and 45% of total silver content) were kept without being obviously changed after water washing 20 times. Accordingly, the electrothermal textiles with specific ratios of polyurethane and metal nanomaterial (e.g. a combination of silver nanowire and silver nano flake) had water washing resistance.

TABLE 4

| Electrothermal textile | Surface electrical resistance before water washing (Ω/□) | Surface electrical resistance after water washing 20 times (Ω/□) |
|---|---|---|
| Example 6 | $1.72 \times 10^{-1}$ | $3.09 \times 10^{-1}$ |
| Example 9 | $1.76 \times 10^{-1}$ | $2.89 \times 10^{-1}$ |

Examples 10 to 13

Preparations and Electrical Tests of Electrothermal Textiles

Examples 10 to 13 were similar to Example 9, with differences of the polyurethane ratio being changed, and the carbon nanocapsule being added, as tabulated in Table 5.

The surface electrical resistance and heating effect of the electrothermal textile were influenced by the carbon nanocapsule of different ratios, as tested and tabulated in Table 5. The total silver content was fixed at 45%, and the carbon nanocapsule ratios were changed. For example, when the carbon nanocapsule ratio increased, the surface electrical resistance of the electrothermal textile was not obviously changed, but the heating effect was correspondingly increased. For example, when the carbon nanocapsule ratio was 3.4%, the heating effect (ΔT) could achieve 30° C.

TABLE 5

| Electrothermal textile | Polyurethane A (%) | Total silver content (%) | Water (%) | Carbon nanocapsule (%) | Surface electrical resistance (Ω/□) | ΔT (° C.) |
|---|---|---|---|---|---|---|
| Example 10 | 48.5 | 45 | 5 | 1.5 | $1.90 \times 10^{-1}$ | 18 |
| Example 11 | 47.6 | 45 | 5 | 2.4 | $1.93 \times 10^{-1}$ | 20 |
| Example 12 | 46.6 | 45 | 5 | 3.4 | $1.79 \times 10^{-1}$ | 30 |
| Example 13 | 45.2 | 45 | 5 | 4.8 | $1.84 \times 10^{-1}$ | 23 |

Furthermore, the water washing resistance of the electrothermal textile in Example 12 was tested, as tabulated in Table 6. The surface electrical resistance of the electrothermal textile in Example 12 was kept without being obviously changed after water washing 20 times. The heating effect (ΔT) of the electrothermal textile in Example 12 was kept at 28° C. after water washing 20 times. Accordingly, the electrothermal textile with specific ratios of polyurethane, metal nanomaterial, and carbon nanocapsule indeed had water washing resistance.

TABLE 6

| Electrothermal textile | Surface electrical resistance before water washing (Ω/□) | Surface electrical resistance after water washing 20 times (Ω/□) | ΔT after water washing 20 times (° C.) |
|---|---|---|---|
| Example 12 | $1.79 \times 10^{-1}$ | $3.96 \times 10^{-1}$ | 28 |

Examples 14 to 17

Preparations and Electrical Tests of Electrothermal Textiles

Examples 14 to 17 were similar to Example 9, with differences of polyurethane A ratio being changed, and the graphite nano sheet being added, as tabulated in Table 7.

The surface electrical resistances and heating effects of the electrothermal textile were influenced by the graphite nano sheet of different ratios, as tested and tabulated in Table 7. The total silver content was fixed at 45%, and the graphite nano sheet ratios were changed. For example, when the graphite nano sheet ratio increased, the surface electrical resistance of the electrothermal textile was slightly reduced. When the graphite nano sheet ratio was 4.5%, the heating effect (ΔT) could achieve 32° C.

TABLE 7

| Electrothermal textile | Polyurethane A (%) | Total silver content (%) | Water (%) | Graphite sheet (%) | Surface electrical resistance (Ω/□) | ΔT (° C.) |
|---|---|---|---|---|---|---|
| Example 14 | 47.5 | 45 | 5 | 2.5 | $1.87 \times 10^{-1}$ | 20 |
| Example 15 | 46.5 | 45 | 5 | 3.5 | $1.82 \times 10^{-1}$ | 23 |
| Example 16 | 45.5 | 45 | 5 | 4.5 | $1.73 \times 10^{-1}$ | 32 |
| Example 17 | 44.5 | 45 | 5 | 5.5 | $1.86 \times 10^{-1}$ | 22 |

Furthermore, the water washing resistance of the electrothermal textile in Example 16 was tested, as tabulated in Table 8. The surface electrical resistance of the electrothermal textile in Example 16 was not changed after water washing 20 times. The heating effect (ΔT) of the electrothermal textile in Example 16 was kept at 31° C. after water washing 20 times. Accordingly, the electrothermal textile with specific ratios of polyurethane, metal nanomaterial, and graphite sheet indeed had water washing resistance.

TABLE 8

| Electrothermal textile | Surface electrical resistance before water washing (Ω/□) | Surface electrical resistance after water washing 20 times (Ω/□) | ΔT after water washing 20 times (° C.) |
|---|---|---|---|
| Example 16 | $1.73 \times 10^{-1}$ | $1.95 \times 10^{-1}$ | 31 |

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. An electrothermal material composition, comprising:
a polyurethane having a repeating unit of Formula (I):

Formula (I)

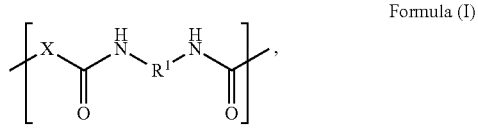

wherein R¹ is

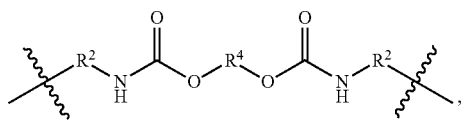

R² is

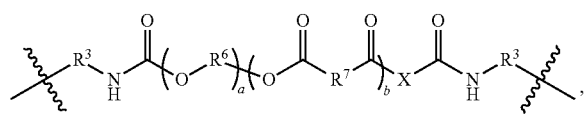

R³ is

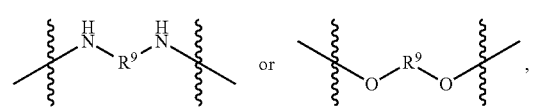

R⁴ is

COOH    SO₃Na
 |        |
 R⁵   or  R⁵

R⁵ is $C_{1-4}$ alkylene group,
R⁶ is $C_{2-6}$ alkylene group,
R⁷ is $C_{2-6}$ alkylene group,
R⁸ is $C_{1-4}$ alkylene group,
X is $$\begin{array}{c}\phantom{x}\\ \text{-N-R}^9\text{-N-}\quad\text{or}\quad\text{-O-R}^9\text{-O-}\end{array}$$

R⁹ is $C_{2-6}$ alkylene group,
a is 1 to 100,
b is 0 to 100, and
a≥b,
wherein the polyurethane has dynamic viscosity of 1000 cP to 5000 cP at 25° C.; and
a plurality of metal nanomaterials are dispersed in the polyurethane,
wherein the metal nanomaterials and the electrothermal material composition have a weight ratio of 30:100 to 60:100.

2. The electrothermal material composition as claimed in claim 1, wherein the polyurethane and the electrothermal material composition have a weight ratio of 40:100 to 50:100.

3. The electrothermal material composition as claimed in claim 1, further comprising a plurality of carbon nanomaterials dispersed in the polyurethane, wherein the carbon nanomaterials and the electrothermal material composition have a weight ratio of 1:100 to 10:100.

4. The electrothermal material composition as claimed in claim 3, wherein the carbon nanomaterials are carbon capsule, carbon tube, graphite sheet, or a combination thereof.

5. The electrothermal material composition as claimed in claim 1, wherein the metal nanomaterials are metal nanowire, metal nano flake, metal nanoparticle, or a combination thereof.

6. The electrothermal material composition as claimed in claim 5, wherein the metal nanowire is gold, silver, copper, indium, palladium, aluminum, iron, cobalt, nickel, an alloy thereof, an oxide thereof, or a mixture thereof.

7. The electrothermal material composition as claimed in claim 5, wherein the metal nanowire is a silver nanowire wrapped by gold, a gold nanowire wrapped by silver, a copper nanowire wrapped by gold, a gold nanowire wrapped by copper, a copper nanowire wrapped by silver, a silver nanowire wrapped by copper, or a combination thereof.

8. The electrothermal material composition as claimed in claim 5, wherein the metal nano flake is gold, silver, copper, indium, palladium, aluminum, iron, cobalt, nickel, an alloy thereof, an oxide thereof, or a mixture thereof.

9. The electrothermal material composition as claimed in claim 5, wherein the metal nanowire is a silver nano flake wrapped by gold, a gold nano flake wrapped by silver, a copper nano flake wrapped by gold, a gold nano flake wrapped by copper, a copper nano flake wrapped by silver, a silver nano flake wrapped by copper, or a combination thereof.

10. An electrothermal textile, comprising:
a textile base; and
an electrothermal material composition formed on the textile base,
wherein the electrothermal material composition comprises:
a polyurethane having a repeating unit of Formula (I):

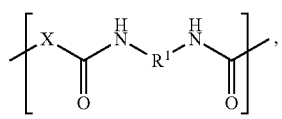

Formula (I)

wherein R¹ is

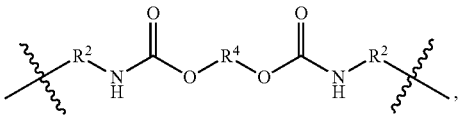

R² is

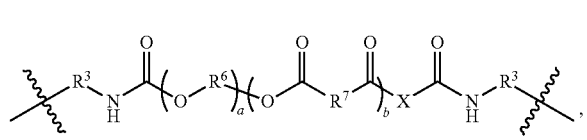

$R^3$ is

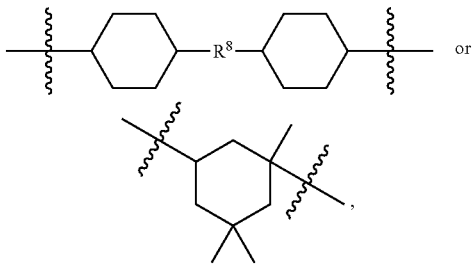 or $R^4$ is

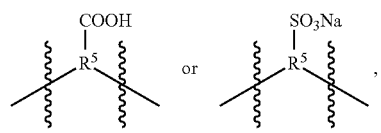, $R^5$ is $C_{1-4}$ alkylene group,
$R^6$ is $C_{2-6}$ alkylene group,
$R^7$ is $C_{2-6}$ alkylene group,
$R^8$ is $C_{1-4}$ alkylene group,
X is

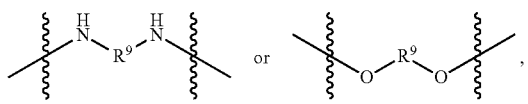, $R^9$ is $C_{2-6}$ alkylene group,
a is 1 to 100,
b is 0 to 100, and
a≥b,
wherein the polyurethane has dynamic viscosity of 1000 cP to 5000 cP at 25° C.; and
a plurality of metal nanomaterials are dispersed in the polyurethane,
wherein the metal nanomaterials and the electrothermal material composition have a weight ratio of 30:100 to 60:100.

11. The electrothermal textile as claimed in claim 10, wherein the polyurethane and the electrothermal material composition have a weight ratio of 40:100 to 50:100.

12. The electrothermal textile as claimed in claim 10, further comprising a plurality of carbon nanomaterials dispersed in the polyurethane, wherein the carbon nanomaterials and the electrothermal material composition have a weight ratio of 1:100 to 10:100.

13. The electrothermal textile as claimed in claim 12, wherein the carbon nanomaterials are carbon capsule, carbon tube, graphite sheet, or a combination thereof.

14. The electrothermal textile as claimed in claim 10, wherein the textile base includes fiber cloth.

15. The electrothermal textile as claimed in claim 14, wherein the fiber cloth comprises cotton, linen, wool, silk, rayon, nylon, polyethylene, polypropylene, polyamide, polyester, acetate, spandex, or a combination thereof.

16. The electrothermal textile as claimed in claim 10, wherein the metal nanomaterials are metal nanowire, metal nano flake, metal nanoparticle, or a combination thereof.

17. The electrothermal textile as claimed in claim 16, wherein the metal nanowire is gold, silver, copper, indium, palladium, aluminum, iron, cobalt, nickel, an alloy thereof, an oxide thereof, or a mixture thereof.

18. The electrothermal textile as claimed in claim 16, wherein the metal nanowire is a silver nanowire wrapped by gold, a gold nanowire wrapped by silver, a copper nanowire wrapped by gold, a gold nanowire wrapped by copper, a copper nanowire wrapped by silver, a silver nanowire wrapped by copper, or a combination thereof.

19. The electrothermal textile as claimed in claim 16, wherein the metal nano flake is gold, silver, copper, indium, palladium, aluminum, iron, cobalt, nickel, an alloy thereof, an oxide thereof, or a mixture thereof.

20. The electrothermal textile as claimed in claim 16, wherein the metal nanowire is a silver nano flake wrapped by gold, a gold nano flake wrapped by silver, a copper nano flake wrapped by gold, a gold nano flake wrapped by copper, a copper nano flake wrapped by silver, a silver nano flake wrapped by copper, or a combination thereof.

* * * * *